Nov. 7, 1939.  F. B. JOHNSON  2,179,297
PORCELAIN-SURFACE PROTECTION
Filed Sept. 8, 1938  2 Sheets-Sheet 1
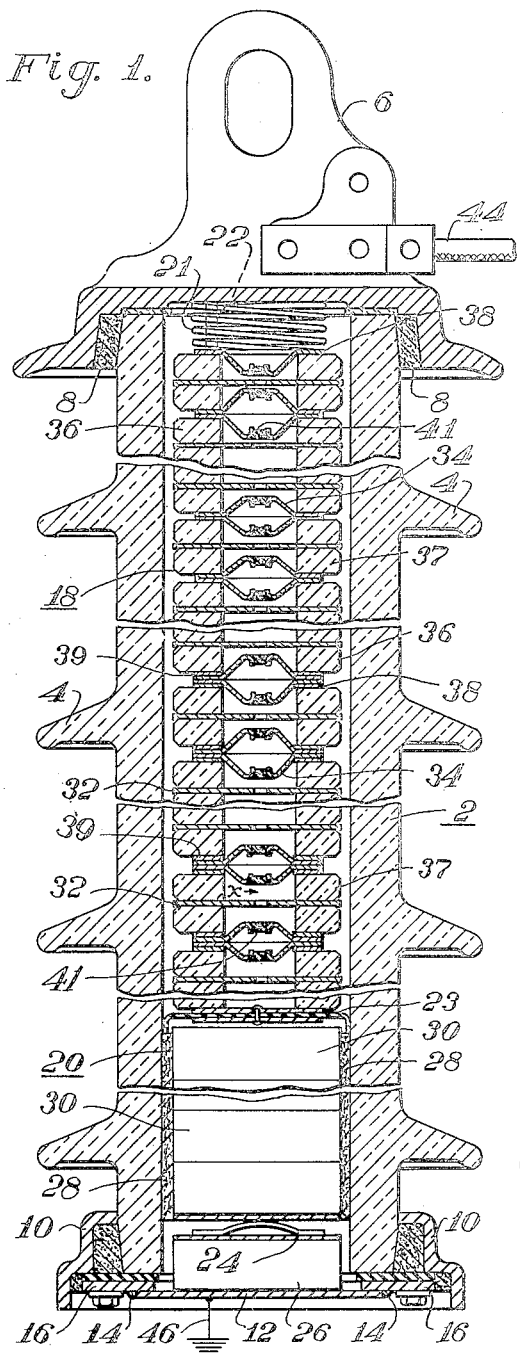
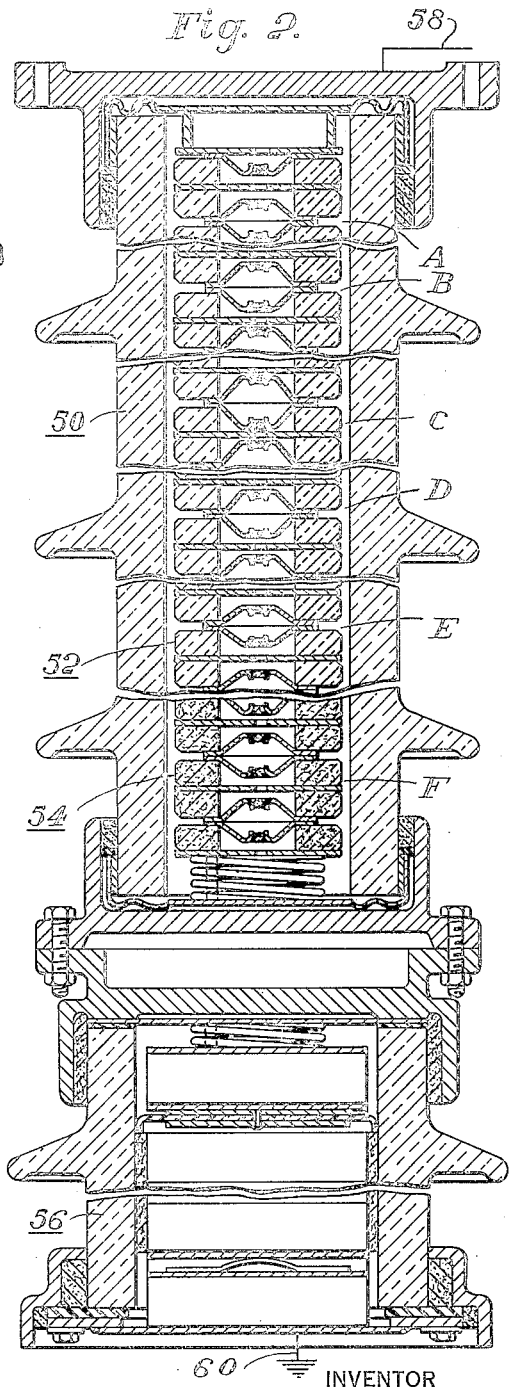
INVENTOR
*Frederick B. Johnson.*
ATTORNEY Nov. 7, 1939.  F. B. JOHNSON  2,179,297

PORCELAIN-SURFACE PROTECTION

Filed Sept. 8, 1938  2 Sheets—Sheet 2

WITNESSES:
Edward Michaels
Bernard L. Zangwill

INVENTOR
Frederick B. Johnson.
BY O. B. Buchanan
ATTORNEY

Patented Nov. 7, 1939

2,179,297

UNITED STATES PATENT OFFICE 2,179,297

PORCELAIN-SURFACE PROTECTION

Frederick B. Johnson, Murrysville, Pa., assignor to Westinghouse Electric & Manufacturing Company, East Pittsburgh, Pa., a corporation of Pennsylvania Application September 8, 1938, Serial No. 228,930

9 Claims. (Cl. 175—30)

An excess-voltage protective device of the type known as lightning arrester has the properties of changing from substantially an insulator, or at least a very high resistance, to a fairly good conductor of electricity in response to a predetermined overvoltage, and then returning substantially to its initial state upon restoration of the normal voltage conditions.

My invention relates particularly to a lightning arrester which includes an air gap or series of air gaps, and a current valve device, and perhaps additional elements, all of the parts of the arrester being protected from the weather by one or more porcelain insulator casings. An arrester of this character, for purposes of identification, may be said to operate upon the auto-valve principle. Lightning arresters operating on this principle as a rule comprise a group or stack of insulated gaps connected in series circuit relation, and some means, usually in the form of discs manufactured according to well known processes, comprising the valve part of the arrester.

The customary series gap stack comprises a plurality of serially arranged air gaps, the gaps being formed between non-arcing electrodes, which may be brass, spaced apart by insulators. The functions of the series gap depend upon the particular structural embodiment of the arrester and usually include; first, keeping the normal voltage of the line or the like from the remaining parts of the arrester; and secondly, breaking down only when a surge of predetermined voltage characteristics occurs, thereby allowing the surge current to pass through the arrester. If the arrester has no separate quench gap, then the series gap stack may have the added function of interrupting the so-called power follow current tending to flow through the arrester after the surge current and voltage have substantially dissipated.

Accordingly, an arrester affording the best protection to the electrical conductor or electrical machinery to which it is applied should have a series gap which will consistently break down when a surge occurs, but which will consistently prevent a sustained power follow current, and further, will have a sufficiently high normal-frequency breakdown voltage to prevent the passage of current through the arrester during normal electrical operating conditions, the last including the normal switching surges.

Moreover, for an acceptable arrester, the series gap stack must perform its required functions unaffected by external conditions such as proximity to grounded parts, or fog or rain on the outer porcelain weather casing, and it is to this last requirement that my invention particularly pertains.

The series gap stack, such as repeatedly referred to above, as a rule comprises a plurality of electrodes which are maintained in spaced relation by means of spacers of insulating material, preferably porcelain. The stack is generally, but not necessarily, directly connected at one end to the high potential side of the line so that it may perform the first function previously mentioned namely, to keep the potential from the remaining parts of the arrester. In a preferred embodiment of my invention the remaining parts of the arrester comprises a valve device and can be employed with or without a quench gap. The valve part of the arrester has the property of conducting the heavy currents present during surges which are in the order of thousands of amperes. However, the voltage across the valve part is in excess but only a small multiple, of the normal line voltage so that when the normal line voltage restores this valve part will carry only a very small power follow current compared to the surge discharge current.

A series gap stack can be designed so as to be fully capable of interrupting the power follow current of the arrester. In certain cases, however, better overall performance of the arrester can be obtained by employing a quench gap in conjunction with a series gap stack and valve part modified to cooperate therewith. Constructions employing quench gaps in lightning arresters are shown in copending application Serial No. 152,416, filed July 7, 1937 by Leon R. Ludwig et al. and assigned to the Westinghouse Electric & Manufacturing Company.

Designs and constructions of lightning arresters briefly and generally described hereinbefore are known at present and form the background for my improvement.

Whatever form the valve part may take, it usually has a leakage resistance and the same may be said for the quench gap assembly, if employed. If now the series gap stack be connected at one end to a high potential side of the line and at its other end to the remaining parts of the arrester which, in turn, have the far end connected to ground, then due to the insulating character of the gap and the leakage resistance character of the valve element, and quench gap, if used, substantially the major portion of the full voltage drop between the ground and line occurs across the series gap stack.

Heretofore, to my knowledge, the separate gaps comprising the series gap were all of the same spacing between their electrodes and yielded a satisfactory series gap stack for the electrostatic field distribution about the arrester during dry weather. However, the electrostatic field distribution about the arrester is materially affected and may be redistributed by the condition of the outside surface of the lightning arrester porcelain weather casing or housing. Such a redistribution would occur when the outside surface of the porcelain becomes thoroughly wetted and changes from an exceptionally good insulator to a high leakage resistance in effect. Under the last circumstances, the distribution may be such as to overstress one or more of the individual gaps of the gap stack to a degree impairing the ability of the gap to operate properly at rated voltage. The amount of overstress under adverse weather conditions may be sufficient to cause the overstressed gaps to become the controlling factor in determining the breakdown of the entire gap stack, and in extreme cases may cause the gap stack to break down with less than its rated voltage applied across its terminals.

It is, therefore, the main object of my invention to increase the normal frequency breakdown voltage of the series gap stack when the protective porcelain casing is wetted on its outside or the equivalent, with the ancillary objects of accomplishing the main object with little, if any, effect on the primary functions of the series gap and the lightning arrester as a whole.

Other objects of my invention will be apparent from the perusal of the following description of two embodiments thereof, in the accompanying drawings of which:

Figure 1 is a sectional view of one embodiment of my invention;

Fig. 2 is a similar view of a second embodiment of my invention;

Figure 4:
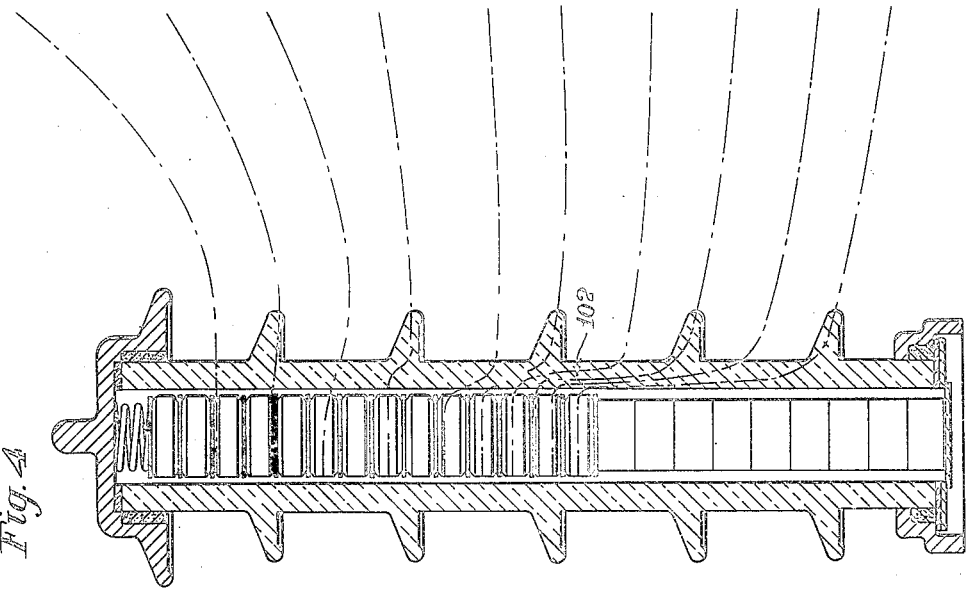
Fig. 4 is a view similar to that of Fig. 3, but with the surface of the arrester assumed thoroughly wetted.

The embodiment of Figure 1 shows the construction of a lightning arrester having a single weather casing 2 provided with a plurality of water sheds or petticoats 4. The casing 2 of this embodiment, as well as of the other embodiment, consists of a tube of wet process porcelain which is substantially non-porous. The tube is closed at its upper or high potential side by an end casting 6 firmly cemented onto the top of the casing 2 by a joint 8, comprising a gasket and cement, in a more or less customary, weather-proof manner.

The bottom of the casing similarly is closed by an end casting 10 cemented to the lower end of the casing 2 and comprises a dropout plate 12 soldered with a solder 14 to ring 16.

Within the casing 2 is disposed the gap stack 18 and the valve part 20 of the arrester. As shown, the assemblage more particularly comprises a coil compression spring 21 between the top end casting and the top of the gap stack with a shunt 22 providing a by-pass for current between the casting and stack. The gap stack extends downwardly within the casing as far as the stop device 23. This stop device comprises an insulated flexible gasket between two conductively connected metallic plates and serves a purpose to be subsequently described. The lower side of the stop device 23 contacts the valve part 20 which extends downwardly into contact with a spring plate 24 resting on a block 26, the latter being also an element of the valve part. Wax such as 28 is poured into the casing to maintain, when hardened, the upper blocks of the valve part 20 securely in position in the casing 2, the stop 23 serving to confine the wax about the blocks of the valve part 20.

The valve part is of conventional design and construction and generally comprises molded, porous, blocks of granulated silicon carbide held together with a water-glass binder. The blocks, of which those identified as 26 and 30 may be deemed representative, are made in certain convenient heights or lengths and give a proper rating for such lengths. By assembling enough blocks together in series any desired kilovolt rating may be secured. The blocks preferably have their sides painted with an insulating paint, and their ends coated with a metal for the purpose of making good electrical contacts, and the latter may be accomplished by any appropriate process although I prefer to spray the metal onto the ends of the block. Inasmuch as the structure of the blocks is known and is not part of this invention, further details as to their manufacture and assembly are not deemed necessary. However, reference may be had to Slepian Patent 1,509,493, granted September 23, 1934 and to the aforementioned application for further details or forms of blocks that may be employed in the arresters described in this application.

The gap stack assembly comprises electrodes 32 and 34 maintained in proper spaced relation by either wet-process porcelain spacers alone or in conjunction with washers. Each of the electrodes 32 is essentially nothing more than a disc and may have a central aperture therein, while each of the electrodes 34 is dish-shaped, as shown, and has a circular flange 38 capable of resting upon the porcelain spacers 36. The central section of each electrode 34 is apertured and may or may not have granulated silicon carbide inserts 41 molded therein. However, I prefer to employ the inserts to improve the performance of the arrester, as described and claimed in my Patent 2,112,097, granted March 22, 1938, and assigned to the Westinghouse Electric & Manufacturing Company. The electrodes 32 and 34 are preferably of brass or other non-arcing metal and are conventional in form.

The structure heretofore described is conventional, and in order to accomplish the purposes of my invention my structure differs from the conventional design by providing different gap lengths between the electrodes of each gap, one such gap length being indicated at X. In the particular construction shown in Fig. 1, the upper group of gaps have porcelain spacers 36 of such width as to yield a gap length of approximately 65 mils. Lower down in the arrester the gap length is changed to 75 mils by providing porcelain spacers 37 of slightly greater thickness. Still further down in the arrester a gap length of 85 mils is employed and in this particular embodiment I achieve this spacing by the use of porcelain spacers similar to the porcelain spacer 36 in the first section with a copper washer 39 of 20 mils. In the lowermost section a spacing X equal to 95 mils is employed and is achieved by a porcelain spacer of a width similar to the spacer 37 employed in the second section and a copper ring spacer of 20 mils thickness. Thus for a 42 kilovolt arrester I may employ fourteen gaps at the top having 65 mils spacing, eight gaps therebelow having 75 mils spacing followed by six gaps of 85 mils spacing, and four gaps at the bottom of 95 mils spacing.

The manner in which the spacing between electrodes is achieved, of course, may be varied. Thus all the porcelain spacers may be made of the same width, and washers such as 39 but of different thicknesses employed to achieve the proper characteristics; or if desired, the electrodes 34 may have different depths for their cup portions. In any event, it is important that the spacings be made different for purposes to be described more fully subsequently.

Suitable terminals are provided for connecting the arrester, and in Fig. 1 a high tension lead 44 is secured to an appropriate terminal in the upper end casting 6, and a ground connection to a terminal that may be unitary with the lower end casting, and schematically represented by 46.

The arrester shown in Fig. 2 is formed of two parts and consists of an upper skirted porcelain insulator tube 50 housing an insulated gap stack 52 and a resistance shunted gap stack 54, and a lower porcelain insulator tube 56 in which is housed the valve part of the arrester. The embodiment of Fig. 2 is employed to indicate that my invention is applicable to any appropriate arrester, it being important only that the spacing between the electrodes of the individual insulated gaps of the arrester be determined by the electrostatic field which ordinarily would cause breakdown of the gap when such is not desired. In a practical embodiment of arrester of Fig. 2, the insulated gaps are spaced, for example, 75 mils in section A; 65 mils in section B; 50 mils in section C; 65 mils in section D and 75 mils in section E, while the resistance shunted gaps in section F may be spaced 65 mils. Suitable terminals for connecting the arrester are provided, the high tension connection and ground connection being schematically indicated at 58 and 60, respectively.

The normal protective operation of the arresters of Figs. 1 and 2 is somewhat conventional. When a surge occurs the gaps stack breaks down and the arrester becomes conducting, the valve part of the arrester limiting the voltage drop while at the same time permitting the large surge currents to pass through the arrester, until the surge is substantially dissipated, after which the arrester restores it to its initial condition. However, I have found that in the conventional design heretofore used employing uniform gap spaces between the electrodes, an occasional breakdown of an arrester would occur under normal operating conditions and line voltage. Such a breakdown invariably happened when the outside surface of the porcelain casings 2, of Fig. 1, or 50 of Fig. 2 was thoroughly wetted. I attribute this eccentric behavior and undesired breakdown of the arrester to the high leakage resistance effect that is substituted on the surface of the porcelain casing when wetted for the substantialy insulating character of the surface when dry.

The effect of the leakage resistance on the outside surface of the casings is to concentrate the electrostatic field at the lower gaps of the porcelain gap section, thereby increasing the intensity of the field at the lower gaps and rendering them subject to greater stresses. Unless provision is made to prevent breakdown of the lower gaps when they are overstressed because of this concentration of the eletrostatic field, then the arrester may break down although no lightning surge is on the line. Moreover, if the arrester breaks down as it sometimes has when subjected to the normal voltages expected from operating conditions of the line, it is manifest that the breakdown will be continuous and the arrester will fail. By increasing the gap lengths at those points or parts of the arrester at which concentrated stresses can be expected under the most adverse surface conditions on the casings, I have entirely eliminated the improper operation of the arrester.

The exact spacings of the arrester will depend largely on the electrostatic fields that may be expected under adverse conditions and for this reason no exact rule for spacing can be established, except to state that the spacings of the electrodes are to be greatest where the greatest concentration of electrostatic field is expected under the conditions which would otherwise cause breakdown of the arrester when none is desired. As an indication of the flexibility of my invention, the two embodiments differ in their gap spacing. Thus the embodiment in Fig. 1 shows the individual gaps are of progressively increased spacing toward the grounded terminal, whereas in the embodiment of Fig. 2 the largest spacings are employed at the top and bottom porcelain gaps with decreased spacing in the intermediate portions thereof.

The theory by which I explain the improved operation of my arrester is as follows: It will be noted that in both figures the bottom sections of the porcelain casing is occupied by elements which are under normal dry conditions conductors as compared with the insulated gap stack section assembled in the top part of the arresters, the said elements comprising the valve part in Fig. 1; and the valve part and resistance shunted gaps in Fig. 2. If voltage is applied to the top of the complete unit and the bottom is grounded, as is the universal manner of connecting arresters, the bottom conducting elements will carry ground potential up to the bottom electrode of the porcelain gap stack. The close capacity coupling between the conducting elements in the bottom of the arrester with the outside surface of the porcelain casing causes the outside of the porcelain casing at the junction between the conducting and insulating units, the valve part and the gap stack in the embodiment of Fig. 1, to assume close to ground potential. However, the bottom gaps in the gap stack are not seriously overstressed in view of the effect of the capacity coupling and the insulating character of the outside of the porcelain casing. If, however, the outside surface of the porcelain casing becomes thoroughly wetted, a high resistance conducting path is in effect formed on the outside of the casing from one end to the other end. This leakage current may be high enough to become the controlling factor in determining the potential on the outside surface of the casing. This may be perhaps better understood by reference to Figs. 3 and 4.

Figure 3:
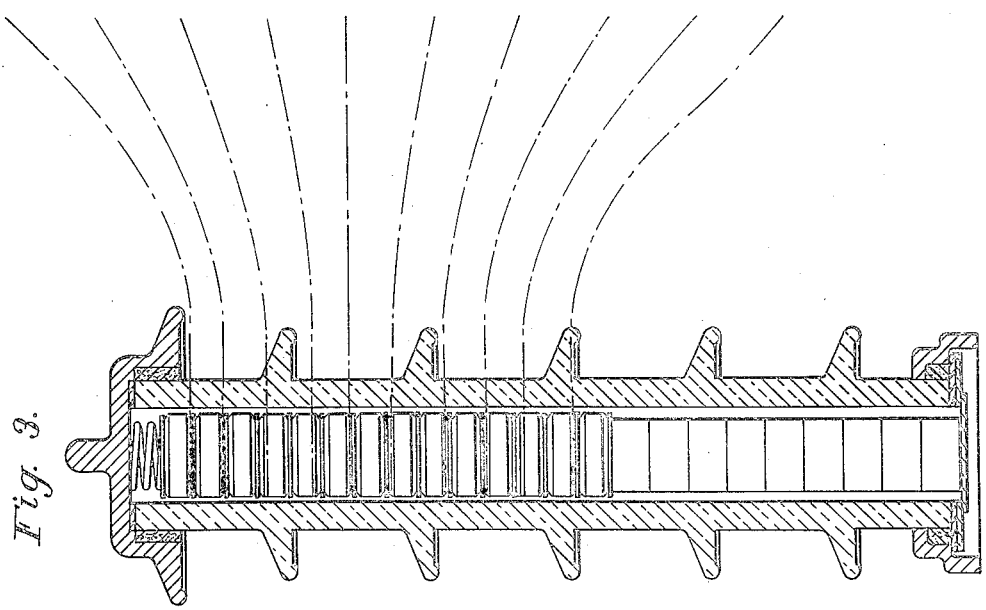
Fig. 3 is a view showing the electrostatic lines of force about the arrester during normal dry conditions. Each line represents a surface of revolution that would be formed by rotating the line about a vertical axis centrally of the arrester.

Fig. 3 diagrammatically shows the approximate shape of the electrostatic field under normal dry operating conditions and voltages with the porcelain casing surface substantially an insulator for an arrester of the type shown in the first embodiment of my invention, and also for the upper unit of the second embodiment.

Fig. 4 diagrammatically shows the approximate field conditions when the outside surface of the porcelain casing becomes slightly conducting due to the presence of moisture, and becomes in effect a high leakage resistance.

In general and by way of explanation, it may be stated that when voltage is applied to the arrester, the voltage divides between the various individual insulated gaps of the series gap stack approximately as indicated by the electrostatic field lines of Figs. 3 or 4, as the case may be. The electrostatic field and division of voltage is represented by equipotential lines or surfaces considered in the three-dimensioned sense. All points on any one equi-potential surface are at the same potential above ground. In addition, each equipotential surface is constructed at a constant voltage difference from the adjacent equipotention surfaces. It follows that where equipotential surfaces come close together, the voltage gradient is high; where they are far apart, the gradient is low; and where they are uniformly spaced, the gradient is uniform.

Examination of Fig. 3 indicates that the voltage gradient in the gap stack under normal dry conditions is fairly uniform, although there is a slight tendency for the voltage to concentrate at the two ends of the stack.

Fig. 4 shows the approximate field conditions when the outside surface of the porcelain becomes slightly conducting due to the presence of moisture. The presence of this high leakage resistance effect causes the voltage on the outside of the porcelain to divide with a fair degree of uniformity from end to end. This forced uniform division of voltage on the outside surface effects a distortion of the field in the porcelain gap stack assembly located in the upper part of the porcelain casing, and causes a concentration of potential or high gradient on the lower portion of this assembly, as indicated by the increased density of the lines at 102 of Fig. 4.

Assuming uniform spacing between the electrodes throughout the insulated series gap stack, Fig. 3 indicates that the voltage gradient under normal conditions and voltages is fairly uniform, although there is a slight tendency for the voltage to concentrate. In prior structures, therefore, the gaps have been uniformly spaced to withstand a predetermined voltage. If none of the individual gaps is stressed beyond that voltage, there will be no breakdown of the whole stack. If, however, one or more individual gaps are overstressed as they might be under the electrostatic field of Fig. 4, it or they will break down thus increasing the potential and gradient on the other gaps and causing them to break down also. This successive breaking down of individual gaps may progress to the point when the complete series gap breaks down and becomes a conductor so that the full potential appears across the remaining parts of the arrester which are conducting to some extent, and the continued heat generation will ultimately cause the arrester to fail.

In the past it has been the practice to either choose the spacing of uniformly spaced gaps so that the highest stressed gaps were not overstressed until the total overall voltage was of a magnitude for which protection was desired, or a second method was employed in which the shape of the field was modified by means of external electrostatic shields modifying the field distortion to desired gradients. These methods did not produce entirely satisfactory results under the abnormal conditions shown in Fig. 4. By my disclosed method, I actually compensate for high field distortion and possible overstressing of the gaps at the lower ends of the porcelain gap stack, by increasing the spacing to the point where they are able to withstand the high concentrated stresses existing under wet conditions with normal applied voltage and operations on the line system.

As a concrete example, assume a gap stack which to provide satisfactory service must not break down at less than 30 k. v. (kilovolts). Suppost this stack is composed of a series of ten individual gaps of equal spacing of say 60 mils. Each of these gaps is designed to withstand approximately 5 k. v. before breaking down. With the extreme field distortion shown in Fig. 4, the lower gaps may be stressed to the failure point of 5 k. v. with a total overall voltage of only 25 k. v. applied in which case the gap stack will break down at 25 k. v. and the protective performance of the device becomes unsatisfactory. Now if I modify the gap structure by increasing the gap spacing at the highest stressed points of Fig. 4 to say 85 mils, the individual gaps at this point will not break down until they are stressed to approximately 7.5 k. v. Accordingly, the breakdown voltage of 7.5 k. v. for the individual gaps will not be reached under the same field conditions that gave 5 k. v. on these gaps with an overall voltage of 25 k. v. To obtain the required breakdown voltage of 7.5 k. v. on the gaps now requires an overall voltage of approximately 37 k. v. and the operation of the device remains satisfactory.

When the porcelain gap stack becomes exceedingly long, the normal field conditions as represented in Fig. 3 may become considerably more distorted than indicated, in which case it should be obvious that this distortion can be compensated for in the same manner as just described. The embodiment of Fig. 3 employs such compensation. In this embodiment, the gap spacings at the top of the porcelain gap are lengthened to compensate for the overstressing occurring at this point under normal field conditions for a long stack while the gaps near the bottom of the porcelain gap section are lengthened to compensate for overstressing occurring at this point under both normal and abnormal field conditions.

It should also be noted that when this invention is used to counteract the abnormal field conditions existing when the porcelain is wet, this can be done without seriously affecting the breakdown performance when dry or when surged. This is because the breakdown under these latter conditions is usually controlled or partly controlled by field conditions at some other point in the gap stack rather than at the oversize gaps. Thus, as an example, an increase of gap spacing in an arrester of 40% in the bottom gaps and 15% in the top gaps giving a total overall increase of spacing of 18% increased the wet gap breakdown by 46%, the dry breakdown by 32%, and the impulse breakdown by only 17%. By proper proportioning of this spacing, an arrester of the original length of the same kilovolt rating can be had with the improved performance.

It may be observed that the stresses of the middle of the gap are decreased under wetter conditions as shown by the decreased density of the stress lines of Fig. 4. However, the spacing of any gaps is determined by the maximum stress of all the stresses it may be subjected to under the different surface conditions on the porcelain housing. The spacing for the middle gaps will, therefore, be determined by dry conditions while the spacing for the end gaps will be determined by wet conditions, as has been described heretofore in detail.

While I have shown and described my invention in the form which I believe to be satisfactory embodiments thereof, it is obvious that many changes may be made in the construction of the arresters and within the spirit and scope of the invention which I have introduced. It is desired, therefore, that the appended claims be given the broadest interpretation limited only by the prior art.

I claim as my invention:

1. In a lightning arrester for a transmission line or the like and of a type which breaks down and becomes a relatively good conductor when an excess voltage surge occurs but which requires a small multiple greater than unity of the crest value of normal frequency voltage to break down under usual operating conditions of the line, a gap stack comprising a plurality of gaps in series circuit relation and each comprising a pair of electrodes, with insulating means for maintaining the electrodes of each pair in spaced relation, a porcelain weather casing about said stack of gaps, said means spacing the electrodes of each said gaps distances which are greater where the normal electrostatic field is made more intense during conditions which affect the exposed surface of said casing in a manner as to render it the equivalent of a high leakage resistance such as occurs if the said surface is thoroughly wetted.

2. In a lightning arrester for a transmission line or the like and of a type which breaks down and becomes a relatively good conductor when an excess voltage surge occurs but which requires a small multiple greater than unity of the crest value of normal frequency voltage to breakdown under usual operating conditions of the line, a gap stack comprising a plurality of gaps in series circuit relation and each comprising a pair of electrodes, with insulating means for maintaining the electrodes of each pair in spaced relation, a porcelain weather casing about said stack of gaps, said means spacing the electrodes of each said gap in such a manner as to distribute the normal voltage drop across said stack when the exposed surface of said casing is in effect a high leakage resistance such as obtains when the said surface is thoroughly wetted, approximately properly so that each gap receives approximately its proper portion of the said voltage drop and has the ability to withstand attendant concentrated stresses, and will not breakdown under such distribution at normal operating voltages.

3. In a lightning arrester for a transmission line or the like of the type which breaks down and becomes a relatively good conductor when an excess voltage surge occurs but which requires a small multiple greater than unity of the crest value of normal frequency voltage to breakdown under operating conditions of the line, a gap stack comprising a plurality of individual gaps in series circuit relation and each comprising a pair of electrodes, spacing means for maintaining the electrodes of each pair in insulated spaced relation, additional elements in said arrester having leakage resistance, one end of said stack being connectible to a high potential and the other end connectible to ground through said leakage resistance, a porcelain weather casing means for said arrester about said stacks and at least part of said additional elements, said spacing means spacing the electrodes of each of said gaps distances which are greater where the electrostatic field is more intense during conditions which affect the outside surface of said casing in a manner such as to render it the equivalent of a high leakage resistance such as occurs when the surface is thoroughly wetted.

4. In a lightning arrester for a transmission line or the like of the type which breaks down and becomes a relatively good conductor when an excess voltage surge occurs but which requires a small multiple greater than unity of the crest value of normal frequency voltage to breakdown under operating conditions of the line, a gap stack comprising a plurality of individual gaps in series circuit relation and each comprising a pair of electrodes, spacing means for maintaining the electrodes of each pair in insulated spaced relation, additional elements in said arrester having leakage resistance, one end of said stack being connectible to a high potential and the other end connectible to ground through said leakage resistance, a porcelain weather casing means for said arrester about said stacks and part of said additional elements, said spacing means spacing the electrodes of each said gap in such a manner as to distribute the normal voltage drop across said stack when the exposed surface of said casing is in effect a high leakage resistance such as obtains when the said surface is thoroughly wetted, approximately properly so that each gap receives approximately its proper portion of the said voltage drop and has the ability to withstand attendant concentrated stresses, and will not breakdown under such distribution at normal voltages.

5. In a lightning arrester for a transmission line or the like of the type which breaks down and becomes a relatively good conductor when an excess voltage surge occurs but which requires a small multiple greater than unity of the crest value of normal frequency voltage to break down under operating conditions of the line, a gap stack comprising a plurality of individual gaps in series circuit relation and each comprising a pair of electrodes, spacing means for maintaining the electrodes of each pair in insulated spaced relation, additional elements in said arrester having leakage resistance, one end of said stack being connectible to a high potential and the other end connectible to ground through said leakage resistance, a porcelain weather casing for said arrester about said stacks, said spacing means spacing the gaps of said stack at the end connectible to ground greater than intermediate gaps.

6. In a lightning arrester for a transmission line or the like of the type which breaks down and becomes a relatively good conductor when an excess voltage surge occurs but which requires a small multiple greater than unity of the crest value of normal frequency voltage to breakdown under operating conditions of the line, a gap stack comprising a plurality of individual gaps in series circuit relation and each comprising a pair of electrodes, spacing means for maintaining the electrodes of each pair in insulated spaced relation, additional elements for said arrester having leakage resistance, one end of said stack being connectible to a high potential and the other end connectible to ground through said leakage resistance, a porcelain weather casing for said arrester about said stacks, said spacing means spacing the end gaps at both ends of said stack greater than the intermediate gaps.

7. A lightning arrester, one end of said arrester being connectible to a high potential and the other end to ground, and having in combination, a porcelain weather casing comprising a tubular insulator having closure means at each end thereof, a gap stack located within the housing and comprising a plurality of individual gaps in series circuit relation, each gap comprising two electrodes and means for maintaining the electrodes of each gap in insulated spaced relation, a valve device in said housing for passing surge currents to ground and comprising a high resistance in series circuit relation with said gap stack, said spacing means comprising insulating rings of different widths with those of relative greater width on the side of the gap structure towards the ground connection.

8. A lightning arrester, one end being connectible to a high potential and the other to ground, and having in combination, a porcelain weather casing comprising a tubular insulator with closure means at each end thereof, a gap stack located within the housing and comprising a plurality of pairs of gaps in series circuit relation, each pair of gaps comprising a central electrode, two dished electrodes oppositely disposed with respect to said central electrode, and spacer means between said electrodes, a valve device in said housing for passing surge currents and having a high resistance in series circuit relation with said gap stack, said spacing means comprising insulating rings between the electrodes of each gap with additional spacer means for gaps on the side toward ground.

9. A lightning arrester, one end being connectible to a high potential and the other to ground, and having in combination, a porcelain weather casing comprising a tubular insulator with closure means at each end thereof, a gap stack located within the housing and comprising a plurality of pairs of gaps in series circuit relation, each pair of gaps comprising a central electrode, two dished electrodes oppositely disposed with respect to said central electrode, and spacer means between said electrodes, a valve device in said housing for passing surge currents and having a high resistance in series circuit relation with said gap stack, said spacing means comprising insulating rings between the electrodes of each gap, the gaps on the side toward the ground having additional washers to increase the spacing between the electrodes.

FREDERICK B. JOHNSON.